United States Patent [19]
Smith et al.

[11] Patent Number: 5,089,241
[45] Date of Patent: Feb. 18, 1992

[54] PROCESS FOR CONVERTING HEXAFLUOROARSENIC ACID OR ANY SALT THEREOF TO ARSENIC ACID OR SALT THEREOF WHICH CAN THEN BE RENDERED NONHAZARDOUS

[75] Inventors: Robert A. Smith, Kinnelon, N.J.; Douglas G. Frick; Charles L. Redmon, both or Orchard Park, N.Y.; Somanahalli N. Subbanna, East Amherst, N.Y.

[73] Assignee: Allied-Signal Inc., Morris Township, Morris County, N.J.

[21] Appl. No.: 633,652

[22] Filed: Dec. 20, 1990

[51] Int. Cl.$^5$ .................. C10B 7/19; C01G 28/00
[52] U.S. Cl. ...................... 423/87; 423/472; 423/484; 423/617
[58] Field of Search .................. 423/87, 462, 472, 617, 423/483, 484, 485

[56] References Cited

U.S. PATENT DOCUMENTS

| | | | |
|---|---|---|---|
| 3,718,736 | 2/1973 | Watson et al. | 423/485 |
| 4,032,621 | 6/1977 | Meadows | 423/488 |
| 4,756,899 | 7/1988 | Jenczewski et al. | 423/483 |
| 4,769,230 | 9/1988 | Greco et al. | 423/617 |
| 4,891,207 | 1/1990 | Broome | 423/617 |
| 4,929,435 | 5/1990 | Boghean et al. | 423/484 |
| 4,954,330 | 9/1990 | Ziegenhain | 423/484 |

FOREIGN PATENT DOCUMENTS

213244 3/1987 European Pat. Off. .
2850707 5/1979 Fed. Rep. of Germany .

OTHER PUBLICATIONS

Lockhart, Dissertation, Vanderbilt, 1967.
Lockhart et al., [J. of Inorg. Nocl. Chem. 3], 407 (1969).
Clark et al., J. of Am. Chem. Soc., 92(4), 816 (1970).
Christe et al., Inorg. Chem. 14(9), 2224 (1975).
Sell, Pollution Engineering, 44 (Aug. 1988).
Arniella et al., Chemical Engineering, 92 (Feb. 1990).

*Primary Examiner*—John Niebling
*Assistant Examiner*—Brian M. Bolam
*Attorney, Agent, or Firm*—Melanie L. Brown; Jay P. Friedenson

[57] ABSTRACT

The present invention provides a process for the conversion of hazardous hexafluoroarsenic acid or any salt thereof to arsenic acid or salt thereof which can be rendered nonhazardous. In particular, the hexafluoroarsenic acid or salt is converted to arsenic acid or salt which can be converted to a water insoluble salt. Known insolubilization and stabilization technology then renders the material nonhazardous.

The present process involves converting hexafluoroarsenic acid or salt thereof contained in an aqueous mixture to arsenic acid or salt thereof. The process comprises the steps of: (a) adding acid selected from the group consisting of sulfuric acid, arsenic acid, perchloric acid, and mixtures thereof to the aqueous mixture in an amount sufficient to catalyze the hydrolysis of the hexafluoroarsenic acid or salt thereof and raising the temperature of the aqueous mixture before, during, or after the acid addition sufficient to remove substantially all of the hydrogen fluoride in subsequent step (b); (b) passing an inert gas through the heated acid mixture steam in a quantity sufficient to remove substantially all of the hydrogen fluoride in the heated acid mixture from the heated acid mixture; and (c) separating substantially all of the hydrogen fluoride from the heated acid mixture whereupon the hexafluoroarsenic acid or salt thereof converts substantially to arsenic acid or salt thereof.

51 Claims, 1 Drawing Sheet

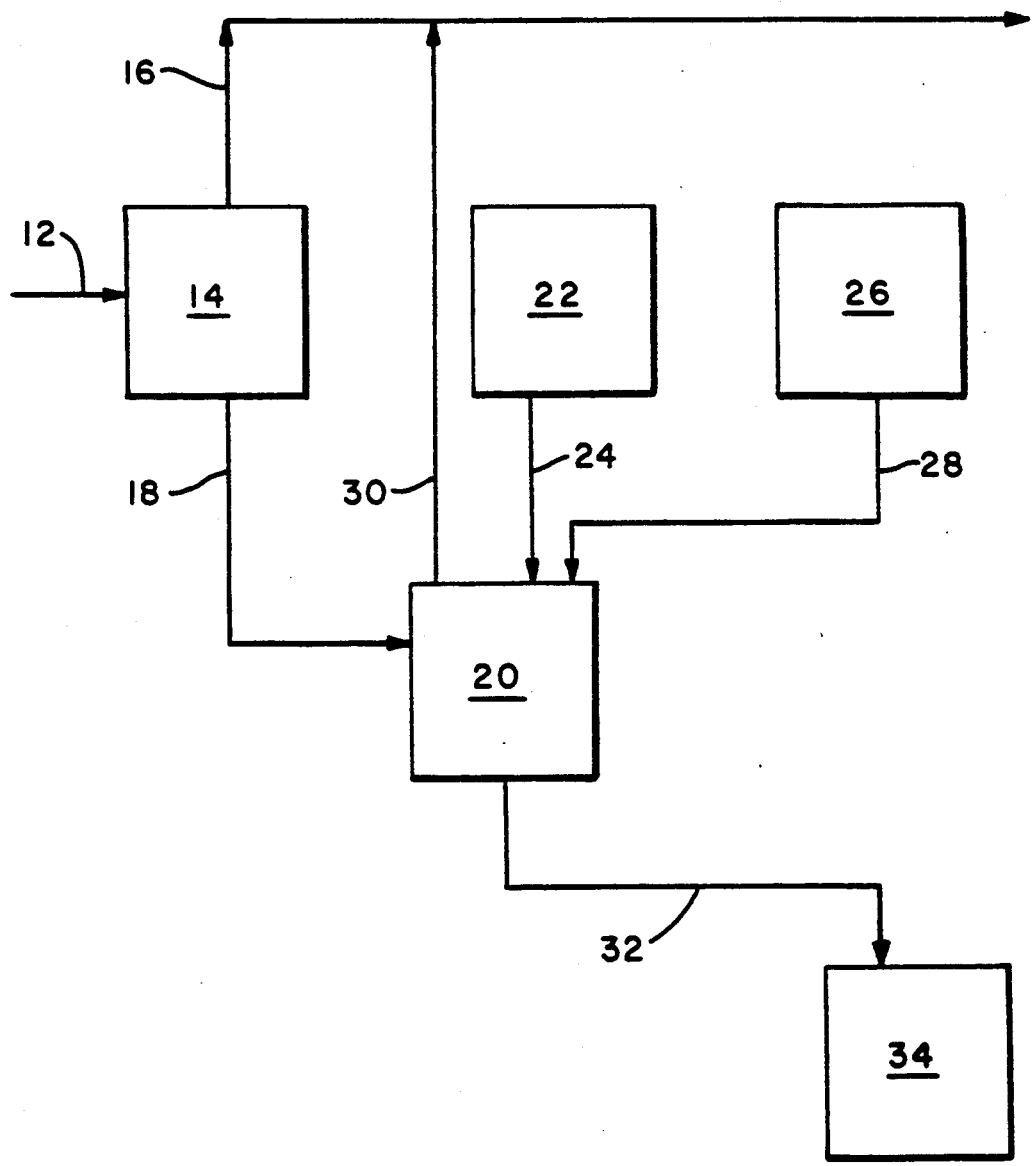

PROCESS FOR CONVERTING HEXAFLUOROARSENIC ACID OR ANY SALT THEREOF TO ARSENIC ACID OR SALT THEREOF WHICH CAN THEN BE RENDERED NONHAZARDOUS

BACKGROUND OF THE INVENTION

This invention relates to a process for the conversion of hazardous hexafluoroarsenic acid or any salt thereof contained in an aqueous mixture to a form that can be made nonhazardous. More particularly, this invention provides a process for converting hazardous hexafluoroarsenic acid ($HAsF_6$) or any salt thereof such as potassium hexafluoroarsenate ($KAsF_6$), sodium hexafluoroarsenate ($NaAsF_6$), ammonium hexafluoroarsenate ($NH_4AsF_6$), calcium hexafluoroarsenate ($Ca(AsF_6)_2$), and magnesium hexafluoroarsenate ($Mg(AsF_6)_2$) contained in an aqueous mixture to arsenic acid ($H_3AsO_4$) or any salt thereof which can then be rendered nonhazardous by the best developed available technology.

A method generally employed in the manufacture of hydrogen fluoride involves heating a mixture of fluorspar and sulfuric acid in a rotating furnace; see for example commonly assigned U.S. Pat. No. 3,718,736. The crude hydrogen fluoride gases leaving the furnace are scrubbed to remove entrained solids, cooled, and condensed to form an initial crude product. The initial crude product formed which comprises at least 95 percent by weight of anhydrous hydrogen fluoride contains various undesirable impurities and these are removed by fractional distillation to give technical or industrial grade anhydrous hydrogen fluoride which has a purity of 99.95% hydrogen fluoride or better. The industrial grade anhydrous hydrogen fluoride thus obtained still contains large quantities of undesirable impurities such as arsenic because the starting material, fluorspar, contains arsenic, and this arsenic cannot be removed in the distillation process. The amount of arsenic impurity which is present in industrial grade anhydrous hydrogen fluoride depends on the arsenic impurity in the fluorspar from which anhydrous hydrogen fluoride is produced. The industrial grade anhydrous hydrogen fluoride generally contains about 50-500 ppm of arsenic impurity.

The presence of arsenic impurity in anhydrous hydrogen fluoride at these levels is highly undesirable for many applications. Anhydrous hydrogen fluoride is used in the refining and chemical manufacturing industries and arsenic impurities in anhydrous hydrogen fluoride can poison the catalyst and contaminate the manufactured product which adversely affects the product quality. In the electronics industry, aqueous solutions of hydrogen fluoride are used as cleaning agents and etchants in the manufacture of semiconductors, diodes, and transistors. A high degree of purity and very low levels of arsenic in anhydrous hydrogen fluoride are required to prevent minute quantities of arsenic impurity from remaining on the surfaces of the electronic industry products after they have been cleaned or etched with hydrogen fluoride. Furthermore, arsenic in anhydrous hydrogen fluoride can ultimately cause an environmental problem for the end user.

Commonly assigned U.S. Pat. No. 4,756,899 provides a process for manufacturing high purity anhydrous hydrogen fluoride having low levels of arsenic impurity by contacting anhydrous hydrogen fluoride product, or an intermediate product obtained during the manufacture of anhydrous hydrogen fluoride with hydrogen peroxide in the presence of a catalyst which comprises effective amounts of molybdenum or an inorganic molybdenum compound and a phosphate compound. The volatile trivalent arsenic impurity in the anhydrous hydrogen fluoride is oxidized to a nonvolatile pentavalent arsenic compound and the resultant mixture is distilled to recover high purity anhydrous hydrogen fluoride with reduced levels of arsenic impurity.

Commonly assigned U.S. Pat. No. 4,929,435 provides a process for manufacturing high purity anhydrous hydrogen fluoride having low levels of arsenic impurity by contacting anhydrous fluoride product, or an intermediate product obtained during the manufacture of hydrogen fluoride, with hydrogen peroxide to oxidize the arsenic impurity in the presence of a catalyst which comprises an effective amount of a component selected from the group consisting of an organic molybdenum compound, vanadium, and a vanadium compound, and a phosphate compound. The volatile trivalent arsenic impurity in the anhydrous hydrogen fluoride is oxidized to a nonvolatile pentavalent arsenic compound and the resultant mixture is distilled to recover high purity anhydrous hydrogen fluoride with reduced levels of arsenic impurity.

U.S. Pat. No. 4,954,330 provides a process for manufacturing purified anhydrous hydrogen fluoride having reduced levels of arsenic impurity by contacting anhydrous hydrogen fluoride with an effective amount of hexavalent chromium oxide and oxygen. The volatile trivalent arsenic impurity in the anhydrous hydrogen fluoride is oxidized to a pentavalent arsenic compound and the resultant mixture is distilled to recover anhydrous hydrogen fluoride with reduced levels of arsenic impurity.

U.S. Pat. No. 4,032,621 provides a process for manufacturing purified anhydrous hydrogen fluoride having reduced levels of arsenic impurity by contacting anhydrous hydrogen fluoride with an oxidizing agent such as potassium permanganate and then with a reducing agent such as hydrogen peroxide. The impurities are converted to residues with low volatility compared to anhydrous hydrogen fluoride and the resultant mixture is distilled to recover anhydrous hydrogen fluoride with reduced levels of arsenic impurity.

Each of the four preceding processes and others involve a distillation step wherein the purified anhydrous hydrogen fluoride is separated from the impurities by distillation. These impurities plus some anhydrous hydrogen fluoride collect in the bottom of the distillation column. A typical make-up of such a mixture which collects in the distillation column bottom is about 75 to about 95 percent by weight hydrogen fluoride, about 2 to about 20 percent by weight water, up to about 5 percent by weight sulfuric acid, and up to about 5 percent by weight hexafluoroarsenic acid or salt thereof.

This typical distillation column bottom has presented the following two problems to the industry. First, the waste contains hexafluoroarsenic acid or salts thereof which cannot be rendered nonhazardous with current stabilization technology. The current practice is to purify a small portion of the total production and either recycle the distillation bottoms to the process or ship the distillation bottoms to a hazardous waste site. The first option reduces the capacity for purified hydrogen fluoride while the second option is expensive and may not be allowed without pretreatment.

Second, hydrogen fluoride will be used in the manufacture of hydrochlorofluorocarbons and hydrofluorocarbons which are considered to be substitutes for the currently used chlorofluorocarbons suspected of detrimentally affecting the ozone layer. As an example of such a manufacturing process, hydrogen fluoride is reacted with vinylidene chloride or 1,1,1-trichloroethane to form 1,1-dichloro-1-fluoroethane (which is known in the art as HCFC-141b). As a result of this increased demand for higher purity hydrogen fluoride, manufacturers seek a means for recovering substantially all of the hydrogen fluoride in the distillation column bottom so as to maximize their yield of purified hydrogen fluoride and minimize production costs.

It has been attempted to convert the hexafluoroarsenic acid or salt thereof to a nonhazardous material but the following problems have been encountered. The hexafluoroarsenate ion is extremely stable and hexafluoroarsenic acid and salts thereof are generally soluble as discussed by Clark et al., "Ligand Substitution Catalysis via Hard Acid-Base Interaction," *J. of Am. Chem. Soc.* 92(4), 816 (1970) and Christe et al., "Novel Oxonium Salts Preparation and Characterization etc.", *Inorg. Chem.* 14 (9), 2224 (1975). Attempts have been made to convert the hexafluoroarsenate ion to a nonhazardous material by hydrolysis. Lockhart, *Dissertation*, Vanderbilt University, 1967, reports on hydrolysis rate studies for dilute hexafluoroarsenate ion in strong sulfuric acid, about 70%. The initial reaction rate is reported to be fast but then it decreases. At high levels of sulfuric acid, the reaction rate decreases indicating an insufficiency of water required for the hydrolysis reaction; at low levels of sulfuric acid, the reaction rate is very slow indicating insufficient sulfuric acid to carry out the required catalysis. This process is commercially unattractive because the reaction rate slows as the process reaches an equilibrium.

Lockhart et al., *J. Inorg. Nucl. Chem.* 31, 407 (1969) reported on the acid hydrolysis of hexafluoroarsenate ion. The article concluded that as the sulfuric acid concentration increases from 45 to 85%, the hydrolysis rate increases, but since the reaction is reversible, ultimately an equilibrium amount of unhydrolyzed hexafluoroarsenate ion is reached. Regardless of the sulfuric acid concentration, time, and temperature studied, an equilibrium occurs wherein at least 150 parts per million of hexafluoroarsenate ion are present. This level of hexafluoroarsenate ion is in excess of that which would allow the resulting material to be rendered nonhazardous.

As such, the need exists in the art for a process which converts substantially all of the hazardous hexafluoroarsenic acid and salts thereof to a form that can be rendered nonhazardous, proceeds in a reasonable amount of time under reasonable conditions, and provides for the recovery of the hydrogen fluoride if desired.

SUMMARY OF THE INVENTION

We have developed a process for treating an aqueous stream containing hexafluoroarsenic acid or salt thereof which not only strips off substantially all of the hydrogen fluoride but converts substantially all of the hexafluoroarsenic acid or salt thereof to arsenic acid or salt thereof which can be rendered nonhazardous. This conversion eliminates the aforedescribed decreased capacity for higher purity hydrogen fluoride and expensive hazardous waste disposal and potential human exposure to a hazardous waste. Also, when the present process treats a hydrogen fluoride distillation column bottom, the stripping of the hydrogen fluoride from the bottom rather than disposal of it, and the subsequent recycling of the stripped hydrogen fluoride improve the overall economics of the process. Additionally, the present process operates in a commercially acceptable amount of time under acceptable conditions. Also, the present process when practiced in conjunction with one of the processes of commonly assigned U.S. Pat. Nos. 4,756,899; 4,929,435; 4,954,330; or 4,032,621 or others allows the use of lower cost fluorspar having a high arsenic content.

In particular, the phrase "hexafluoroarsenic acid or salt thereof" as used herein refers to the nonvolatile pentavalent arsenic compound of commonly assigned U.S. Pat. Nos. 4,756,899 and 4,929,435 or others.

Thus, the present process converts hexafluoroarsenic acid or salt thereof contained in an aqueous mixture to arsenic acid or salt thereof. The process comprises the steps of: (a) adding acid selected from the group consisting of sulfuric acid, arsenic acid, perchloric acid, and mixtures thereof to the aqueous mixture in an amount sufficient to catalyze the hydrolysis of the hexafluoroarsenic acid or salt thereof and raising the temperature of the aqueous mixture before, during, or after the acid addition sufficient to remove substantially all of the hydrogen fluoride in subsequent step (b); (b) passing an inert gas through the heated acid mixture in a quantity sufficient to remove substantially all of the hydrogen fluoride in the heated acid mixture from the heated acid mixture; and (c) separating substantially all of the hydrogen fluoride from the heated acid mixture whereupon the hexafluoroarsenic acid or salt thereof converts substantially to arsenic acid or salt thereof.

Prior to the present invention, the mixture remaining in the distillation column bottoms after practicing the process of commonly assigned U.S. Pat. No. 4,756,899 or 4,929,435 and others contained hazardous hexafluoroarsenic acid or a salt thereof and was recycled to the process or shipped to a hazardous waste site for disposal. In contrast, the arsenic acid or salt thereof generated from the present invention forms water insoluble salts which can be stabilized by conventional waste disposal technology and then landfilled as a nonhazardous waste or recovered as a product.

We have found that the hydrolysis reaction of the hexafluoroarsenate ion can only proceed to completion when substantially all hydrogen fluoride (including that produced by the hydrolysis reaction) is removed from the reaction mass. Since hydrogen fluoride and water form an azeotrope, hydrogen fluoride removal is impossible by simple distillation. We have found, however, that addition of acid selected from the group consisting of sulfuric acid, arsenic acid, perchloric acid, and mixtures thereof in an amount sufficient to break the hydrogen fluoride-water azeotrope will also function to catalyze the hydrolysis reaction, in this way facilitating hydrogen fluoride removal.

Thus, it is an object of the present ivention to provide a process for the conversion of hazardous hexafluoroarsenic acid or salt thereof to arsenic acid or a salt thereof that can be made nonhazardous.

Another object is to increase the recovery of hydrogen fluoride from a commercial process.

Other objects and advantages of the present invention will be apparent from the following description and attached claims.

BRIEF DESCRIPTION OF THE DRAWING

The FIGURE is a schematic of the present invention.

DETAILED DESCRIPTION OF THE PREFERRED EMBODIMENTS

The present invention treats any aqueous starting stream which contains hexafluoroarsenic acid or any salt thereof. Such aqueous starting streams may also contain acids such as sulfuric, phosphoric, fluosilicic, or fluosulfonic; bases such as sodium or potassium hydroxide; or suitable solvents for hexafluoroarsenic acid or salts thereof such as alcohols.

The present invention preferably treats the aqueous mixture, which contains hydrogen fluoride, remaining in the distillation column bottom after practicing the process of commonly assigned U.S. Pat. Nos. 4,756,899 or 4,929,435; these patents are incorporated herein by reference. Such a mixture comprises about 75 to about 95 percent by weight hydrogen fluoride, about 2 to about 20 percent by weight water, up to about 5 percent by weight sulfuric acid, and up to about 5 percent by weight hexafluoroarsenic acid or any salt thereof. Generally speaking, this mixture is considered poisonous and carcinogenic because the waste contains arsenic compounds and is corrosive because the pH is less than 2. In the United States, the stabilized waste must pass the Toxic Characteristics Leach Procedure Test established by the Environmental Protection Agency in order to be considered nonhazardous. Other countries have applicable regulations. Hexafluoroarsenic acid and its salts are acid, alkali, and water soluble and technology for the stabilization of these salts is unknown. To declassify the hazardous waste to nonhazardous, it is necessary to convert the arsenic in the waste to a form that can be stabilized and will meet or exceed the appropriate local regulations for declassifying a hazardous waste.

Examples of salts of hexafluoroarsenic acid which may be present in the starting aqueous mixture include potassium hexafluoroarsenate ($KAsF_6$), sodium hexafluoroarsenate ($NaAsF_6$), ammonium hexafluoroarsenate ($NH_4AsF_6$), calcium hexafluoroarsenate ($Ca(AsF_6)_2$) and magnesium hexafluoroarsenate ($Mg(AsF_6)_2$) or any other salt that cannot be rendered nonhazardous.

In step (a) of the present process, commercially available sulfuric, arsenic, or perchloric acid or mixtures thereof are added to the aqueous mixture in an amount sufficient to catalyze the hydrolysis of the hexafluoroarsenic acid or salt thereof and the temperature of the aqueous mixture is raised before, during, or after the acid addition sufficient to remove substantially all of the hydrogen fluoride in a later step.

Although the starting aqueous mixture may be heated before, during, or after the acid addition, preferably, the aqueous mixture is heated before the acid addition. One reason for preheating the aqueous starting mixture is to concentrate the hexafluoroarsenic acid or salt thereof for subsequent reaction thereof. Without the preheating step, the concentration of the hexafluoroarsenic acid or salt thereof would be so low that a much larger amount of acid would have to be added to catalyze the hydrolysis as will be explained later. The use of such additional acid would make the present process more expensive.

Preferably, the starting aqueous material has a hexafluoroarsenic acid or salt thereof concentration of about 20 to about 50 percent by weight. If the starting material contains less than this concentration, an evaporation step is preferably used. Referring to the FIGURE, the starting aqueous mixture is transferred as indicated by the arrow 12 to evaporator 14.

In evaporator 14, the starting aqueous mixture is subjected to evaporation so as to concentrate the hexafluoroarsenic acid or salt thereof by removing part of the hydrogen fluoride. Preferably, the starting aqueous mixture is heated to a temperature of about 50° C. to about 150° C. More preferably, the starting aqueous mixture is heated to a temperature of about 70° C. to about 105° C. Arrow 16 indicates the flow of vaporized hydrogen fluoride out of the evaporator 14; typically, the vaporized hydrogen fluoride is recycled to the beginning of the hydrogen fluoride manufacturing process.

After evaporation, preferably, the resulting product comprises about 30 to about 60 percent by weight hydrogen fluoride, about 20 to about 40 percent by weight water, about 20 to about 40 percent by weight hexafluoroarsenic acid or salt thereof, and up to about 20 percent by weight acid. More preferably, the resulting product preferably comprises about 50 to about 60 percent by weight hydrogen fluoride, about 20 to about 30 percent by weight water, about 20 to about 40 percent by weight hexafluoroarsenic acid or salt thereof, and up to about 20 percent by weight acid. The resulting product is transferred out of evaporator 14 as indicated by arrow 18 to reactor 20.

If the evaporation step is insufficient to raise the temperature of the aqueous mixture so as to remove substantially all of the hydrogen fluoride in a later step, the aqueous mixture has to be heated in another step. In this heating step, the aqueous mixture may be heated before the acid is added, while the acid is being added, or after the acid is added. If the aqueous mixture is heated while the acid is being added or after the acid is added, reactor 20 may contain any commercially available heating means such as heating coils or a heat exchanger for this purpose. As will be readily apparent to those skilled in the art, the means for raising the temperature of the aqueous mixture is unimportant as long as the temperature is raised sufficiently to remove substantially all of the hydrogen fluoride in subsequent step (b).

Reactor 20 must be made of a material which is not attacked by this corrosive mixture so as to preclude contamination by extraneous material from the reactor 20 and ensure a useful life of the equipment. Accordingly, all surfaces of the reactor 20 which come into contact with the corrosive mixture must be inert to the corrosive mixture.

Commercially available sulfuric acid, arsenic acid, or perchloric acid or mixtures thereof which are contained in vessel 22 is added to reactor 20 as indicated by arrow 24. One reason for the acid addition is to catalyze the hydrolysis of the hexafluoroarsenic acid or salt thereof. Mixtures of acids in any proportions may be used. The mixture may be of two or more acids. The preferred acid is sulfuric acid. We have found that the acid may be preheated prior to addition to reactor 20 in order to reduce the later reaction time and amount of heat subsequently required to raise the temperature of the aqueous mixture. Any commercially available heating means may be used for this purpose.

Hydrogen fluoride and water form an azeotrope when the weight percent of the hydrogen fluoride based on the total weight of the hydrogen fluoride and water is at least 38. In this case, the acid is added in an amount which is sufficient to break the azeotrope and also to catalyze the hydrolysis of the hexafluoroarsenic acid or salt thereof. The amount of acid required to break the azeotrope between hydrogen fluoride and water is preferably at least about 45 weight percent based on the total weight of the aqueous mixture at the time of acid addition and the added acid. This amount of acid is also sufficient to catalyze the hydrolysis of the hexafluoroarsenic acid or salt. More preferably, the amount of acid is about 45 to about 85 weight percent based on the total weight of the aqueous mixture at the time of acid addition and the added acid following heating prior to inert gas stripping.

In step (b), an inert gas is passed through the heated acid mixture in a quantity sufficient to remove substantially all of the hydrogen fluoride in the heated acid mixture from the heated acid mixture. Any inert gas which is capable of removing substantially all of the hydrogen fluoride may be used for this step. Examples of useful inert gases include steam, air, nitrogen, methane, and carbon dioxide. Mixtures of inert gases may also be used.

The amount of inert gas required is a function of the reaction temperature at which the inert gas is added. At 150° C. for example, a minimum of about ten moles of inert gas, per mole of hydrogen fluoride in the reaction mixture prior to gas addition, is required in order to substantially remove all of the hydrogen fluoride. Because the partial pressure of hydrogen fluoride increases with temperature, higher reaction temperatures require less inert gas while lower reaction temperatures require more inert gas. Also, the degree and uniformity of mixing of the inert gas with the liquid reaction mixture are factors in determining the amount of inert gas to be used.

Preferably, steam is used so that the steam supplies heat to the reaction mixture, further raising the temperature and thus minimizing the quantity of gas needed to substantially remove all of the hydrogen fluoride. More preferably, the steam raises the temperature of the aqueous mixture sufficient to remove substantially all of the hydrogen fluoride. Steam which is contained in vessel 26 is added to reactor 20 as indicated by arrow 28.

Regardless of whether the aqueous mixture is heated by the evaporation step alone, by the evaporation step and an indirect heating step, by the evaporation step and heat supplied by steam, or any other heating combination, preferably the temperature of the reaction mixture after the inert gas addition is about 75° C. to about 200° C. If the reaction temperature is much below 75° C., the amount of hydrogen fluoride removed is inadequate; the lack of appropriate materials of construction prevents the use of reaction temperatures much higher than 200° C. More preferably, the temperature of the reaction mixture is about 130° C. to about 175° C.

As indicated by arrow 30, the vaporized anhydrous hydrogen fluoride which may also contain water vapor flows out of reactor 20, combines with the vaporized anhydrous hydrogen fluoride coming out of evaporator 14, and is recycled to the hydrogen fluoride manufacturing process. The recycled hydrogen fluoride can be recovered and the water can be reacted with oleum to form sulfuric acid which is useful in the process.

Although hexafluoroarsenic acid or salt will be partially converted to arsenic acid in the presence of hydrogen fluoride, we have found that in order to effect transformation of substantially all of the hexafluoroarsenic acid or salt to arsenic acid or salt, substantially all of the anhydrous hydrogen fluoride must be removed from the mixture in reactor 20. Representative reactions which may occur are:

$$HAsF_6 + 4H_2O \rightarrow H_3AsO_4 + 6HF$$

$$MAsF_6 + 4H_2O \rightarrow MH_2AsO_4 + 6HF$$

$$X(AsF_6)_2 + 8H_2O \rightarrow X(H_2AsO_4)_2 + 12HF$$

wherein M represents monovalent cations and X represents divalent cations and is analogous for multivalent cations.

Preferably, the resulting mixture comprises about 5 to about 25 weight percent arsenic acid or salt thereof, about 15 to about 40 weight percent water, and about 45 to about 85 weight percent acid. More preferably, the resulting mixture comprises about 20 to about 25 weight percent arsenic acid or salt thereof, about 15 to about 25 weight percent water, and about 55 to about 65 weight percent acid. This mixture is typically cooled in order to make the product less corrosive and easier to handle and is drained from reactor 20 as indicated by arrow 32 to storage tank 34.

The arsenic acid in the resulting mixture from storage tank 34 may be recovered or this resulting mixture can be rendered nonhazardous by the use of known methods such as discussed by Nancy J. Sell, "Solidifiers for Hazardous Waste Disposal", *Pollution Engineering*, 44 (August 1988) and Elio F. Arniella et al., "Solidifying Traps Házardous Wastes", *Chemical Engineering*, 92 (February 1990). Typically, the acid mixture will be converted to a water insoluble salt which can then be rendered nonhazardous. For example, this mixture may be reacted with commercially available calcium oxide so as to form the water insoluble calcium arsenate, $Ca_3(AsO_4)_2$. The reaction which occurs is:

$$2H_3AsO_4 + 3CaO \rightarrow Ca_3(AsO_4)_2 + 3H_2O$$

The mixture may also be reacted with any suitable alkali for neutralization and any calcium or magnesium compound (that provides calcium or magnesium ions) to react with the arsenate. This includes but is not limited to calcium or magnesium hydroxides, chlorides, carbonates, and oxides or combinations such as dolomites including calcium and magnesium carbonate. Cement may then be added in various ratios to solidify and chemically stabilize the insoluble calcium arsenate. When subjected to the EPA Toxic Characteristics Leach Procedure Test, the cement encased calcium arsenate meets the criteria and is considered nonhazardous.

The present invention is more fully illustrated by the following non-limiting Examples.

For Examples 1 through 12, the starting material (hereinafter referred to as "SRC") was an intermediate between stream 12 and stream 18 in the Figure and was as follows:

| | Wt. % |
|---|---|
| HF | 63 |
| HAsF$_6$ | 12 |

-continued

| | Wt. % |
|---|---|
| H₂SO₄ | 0.6 |
| Miscellaneous (Organic, PO₄, Mo, etc.) | 0.4 |
| H₂O | 24 |

Under United States regulations, this waste is considered poisonous and carcinogenic because the waste contains arsenic and the waste is corrosive because the pH is <2. To declassify the waste from hazardous to nonhazardous, it is necessary to convert it to a form that can be stabilized and pass the appropriate testing procedures. We determined that the hexafluoroarsenic acid or salts thereof must be converted to arsenic acid or salt thereof which forms many water insoluble salts. The reaction is as follows:

$$HAsF_6 + 4H_2O \rightarrow H_3AsO_4 + 6HF$$

In all of the following Examples, the results are listed as weight percent. "TA as H₂SO₄" means the total acid components including sulfuric acid (H₂SO₄), arsenic acid (H₃AsO₄), hexafluoroarsenic acid (HAsF₆) and phosphoric acid (H₃PO₄). The final concentration of the arsenic acid or salts is not important to the process of this invention.

EXAMPLES 1–4

The following examples were done in open vessels by mixing one part of the aforedescribed SRC with one part sulfuric acid. The temperature was varied from 75° C. to 150° C. for a period of 1 to 27 hours. There was cross-current air flow over the surface of the reaction mixture. The results are in Table 1 below.

TABLE 1

| EX | TEMP (°C.) | TIME (HR) | HF (%) | % Ta as H₂SO₄ | % TOTAL (As) | % H₃AsO₄ as As | % (AsF6) as As |
|---|---|---|---|---|---|---|---|
| 1 | 150 | 1 | <0.5 | 88 | 4.8 | 5.2 | −0.4 |
| 2 | 150 | 1 | <1 | 96.2 | 6.1 | 6.5 | −0.4 |
| 3 | 100 | 1 | 3.3 | 71.8 | 2.1 | 0.02 | 2.1 |
|   |   | 2 | 0.93 | 74.7 | 2.1 | 1.4 | 0.7 |
|   |   | 3 | <0.3 | 76.5 | 2.3 | 2.4 | −0.1 |
|   |   | 4 | <0.3 | 78.0 | 2.4 | 2.4 | 0.0 |
| 4 | 75 | 3 | 1.0 | — | — | — | — |
|   |   | 19 | <0.3 | — | — | — | — |
|   |   | 27 | <0.3 | — | — | — | <40 ppm |

Negative numbers for the (AsF₆)As are due to the analytical procedure used. Example 4 employed a more sensitive method. Although not reported, low values for the (AsF₆)As mean that substantially all the hexafluoroarsenic acid or salts thereof have been hydrolyzed.

These Examples illustrate that when the hydrogen fluoride is substantially removed from the solution, the hydrolysis of the hexafluoroarsenic acid or salt thereof is substantially complete. Example 3 clearly indicates the need for removal of substantially all of the hydrogen fluoride to complete the hydrolysis. These Examples further indicate that temperatures greater than 75° C. can accomplish the hydrolysis if enough time is allowed. As the temperature increases, the time decreases.

EXAMPLES 5–7

Examples 5 through 7 were conducted in closed vessels with the aforedescribed SRC and sulfuric acid. The results are in Table 2 below.

TABLE 2

| EX | TEMP (°C.) | TIME (HRS) | % HF | % (AsF6) as As |
|---|---|---|---|---|
| 5 | 125 | 1 | 1.7 | 1.9 |
| 6 | 150 | 1 | 8.0 | 3.6 |
| 7 | 150 | 1 | 16.0 | 2.8 |

The above results indicate that with conditions similar to those of Examples 1 through 4, the hydrolysis was incomplete. This shows that the cross-current air flow over the open vessel experiment is very important in removing the hydrogen fluoride such that the hydrolysis proceeds. An inert gas purge would act the same as the air flow in Examples 1 through 4.

EXAMPLES 8–10

Examples 8 through 10 were done in a closed vessel with steam as an inert purge gas. The aforedescribed SRC and sulfuric acid were used. 500 grams of the SRC were preheated to 115° C. and 250 grams of the sulfuric acid were preheated to 73° C. When the two were mixed, this allowed the volatile hydrogen fluoride and water to escape decreasing the quantity of sulfuric acid required. Mixing the preheated materials raised the reaction mixture temperature to 131° C. This mixture was purged with 140° C. steam. In Examples 9 and 10, the sulfuric acid was preheated to 50° C. The results are in Table 3 below.

TABLE 3

| EX | TEMP (°C.) | TIME (MIN) | % TA as H₂SO₄ | % HF | (AsF6) as As (ppm) |
|---|---|---|---|---|---|
| 8 | 153–180 | 105 | 72.4 | <0.2 | 1 |
| 9 | 132–151 | 60 | 62.4 | 0.2 | 4.9 |
| 10 | 141–160 | 30 | 69.8 | 0.2 | 2.2 |

The above results indicate that purging with an inert gas such as steam removes substantially all the hydrogen fluoride and hydrolyzes substantially all the hexafluoroarsenic acid or salt thereof in closed vessels. Steam acts as an inert gas in the above examples because once the solution is saturated with water, steam will pass through as a gas. The above examples also indicate that a reaction time of 30 minutes or more is required for the hydrolysis reaction. It is believed that the hydrolysis may be completed in less time with higher temperatures, higher acid content, or higher purging rates. The above examples also indicate that differences in preheating temperatures do not appear to affect the final results.

EXAMPLE 11

The aforedescribed SRC and sulfuric acid were used. 500 grams of SRC were preheated to 115° C. The mixture was cooled quickly to avoid further losses. The SRC at this point weighed 142 grams. 142 grams of sulfuric acid was preheated to 50° C. and the SRC reheated to 115° C.; the two were mixed to give a ratio of 1:1. Steam was used as in inert gas in the hydrogen fluoride removal. The results are as follows in Table 4.

TABLE 4

| EXAMPLE | TEMP (°C.) | TIME (MIN) | (AsF6) as As (ppm) |
|---|---|---|---|
| 11 | 147 | 30 | 21 |

These results indicate that substantially all the hydrogen fluoride can be removed and substantially all the hexafluoroarsenic acid or salts thereof can be hydrolyzed at ratios of 1:1 for the sulfuric acid and the preheated SRC. Preheating the SRC before acid addition removes the volatile components thereby increasing the concentration of the hexafluoroarsenic acid or salts thereof and decreasing the sulfuric acid consumption. Greater than 45% sulfuric acid may accomplish these same results.

EXAMPLE 12

This Example using nitrogen as an inert gas demonstrate that other inert gases will accomplish the hydrogen fluoride removal and subsequent hydrolysis.

500 grams of the aforedescribed SRC were preheated to 113° C. and 200 grams of the same sulfuric acid were preheated to 150° C. and mixed. The resulting temperature was 127° C. External heat was supplied to raise the temperature to 150° C. to 160° C. and the mixture was purged with nitrogen gas. The results are given below in Table 5.

TABLE 5

| EX | TEMP (°C.) | TIME (MIN) | % HF | (AsF6) as As (ppm) |
|---|---|---|---|---|
| 12 | 142 | 120 | <0.1 | <15 |

The above results indicate that nitrogen acts as an inert gas for removal of substantially all the hydrogen fluoride and hydrolysis of substantially all the hexafluoroarsenic acid or salts thereof when the sulfuric acid concentration and temperature are maintained. Any non-reactive inert gas can be used for the purge.

EXAMPLES 13-14

These Examples demonstrate the use of arsenic acid in place of sulfuric acid for hydrogen fluoride removal and hydrolysis.

The starting material for the following experiments in a closed system was prepared by adding hydrogen fluoride to an arsenic acid solution. The starting material was heated and purged with a slow flow of heated nitrogen. The reaction temperature was maintained at about 140° C. for 3 hours to 5 hours. Small amounts of water were added to maintain the volume in the reactor. The results are in Table 6 below.

TABLE 6

| EXAMPLE | 13 | 14 |
|---|---|---|
| START | | |
| $H_3AsO_4$, % | 70.4 | 61.6 |
| HF, % | 3.6 | 8.7 |
| $H_2O$, % | 26 | 29.5 |
| CONDITIONS | | |
| Temperature, °C. | 135 | 140 |
| Time, Hrs. | 3 | 5 |
| END | | |
| $H_3AsO_4$, % | 82 | 85 |
| HF, % | 0.1 | 0.2 |
| $H_2O$, % | 18 | 15 |
| $AsF_6$, ppm | 14 | 17 |

These examples show that arsenic acid performs as sulfuric acid in the process of this invention. The concentration of arsenic acid is at least 45% and the temperature is at least 100° C. Preferably, the concentration of arsenic acid is 60% to 85% and the temperature is 120° C. to 150° C.

EXAMPLES 15-18

The following arsenic acid solutions were converted into non-hazardous wastes based on the TCLP Leach Test.

The following arsenic acid or salts thereof containing wastes were neutralized with excess calcium hydroxide to form the insoluble calcium arsenate. The neutralized waste was stabilized with cement and cured and subjected to the TCLP Leach Test. The results are given below in Table 7 below.

TABLE 7

| | Pre-Treatment | | | Post-Treatment TCLP |
|---|---|---|---|---|
| EX | % TA as $H_2SO_4$ | % $H_3AsO_4$ | (AsF6)As (ppm) | Leachable As (ppm) |
| 15 | 64.8 | 4.4 | 11 | 0.44 |
| 16 | 65.8 | 4.9 | 10 | 0.25 |
| 17 | 69.2 | 7.0 | 10 | 0.24 |
| 18 | 62.7 | 5.0 | 32 | 0.43 |

Each Example met or exceeded the EPA criteria for declassifying the hazardous acidic arsenic waste to non-hazardous with known stabilization technology. The Examples indicate that when the hexafluoroarsenic acid or salts thereof are substantially all hydrolyzed to arsenic acid or salts thereof, they can be rendered nonhazardous.

Having described the invention in detail and by reference to preferred embodiments thereof, it will be apparent that modifications and variations are possible without departing from the scope of the invention defined in the appended claims.

What is claimed is:

1. A process for converting hexafluoroarsenic acid or salts thereof contained in an aqueous mixture to arsenic acid or salts thereof comprising the steps of:
   (a) adding acid selected from the group consisting of sulfuric acid, arsenic acid, perchloric acid, and mixtures thereof to said aqueous mixture in an amount sufficient to catalyze the hydrolysis of said hexafluoroarsenic acid or salt thereof and raising the temperature of said aqueous mixture before, during, or after said acid addition sufficient to remove substantially all of the hydrogen fluoride in subsequent step (b);

(b) passing an inert gas through said heated acid mixture in a quantity sufficient to remove substantially all of the hydrogen fluoride in said heated acid mixture from said heated acid mixture; and (c) separating substantially all of the hydrogen fluoride from said heated acid mixture whereupon said hexafluoroarsenic acid or salt thereof converts substantially to arsenic acid or salt thereof.

2. The process of claim 1 wherein said starting aqueous mixture additionally contains hydrogen fluoride.

3. The process of claim 2 wherein said starting aqueous mixture comprises about 75 to about 95 percent by weight said hydrogen fluoride, about 2 to about 20 percent by weight said water, up to about 5 percent by weight sulfuric acid, and up to about 5 percent by weight said hexafluoroarsenic acid or salt thereof.

4. The process of claim 1 wherein after said step (c), said acid mixture is converted to a water insoluble salt which can be rendered nonhazardous.

5. The process of claim 1 wherein after said step (c), said arsenic acid is recovered.

6. The process of claim 1 wherein said aqueous mixture is heated after said acid addition.

7. The process of claim 1 wherein said aqueous mixture is heated during said acid addition.

8. The process of claim 1 wherein said aqueous mixture is heated before said acid addition.

9. The process of claim 2 wherein after said step (c), said acid mixture is converted to a water insoluble salt which can be rendered nonhazardous.

10. The process of claim 2 wherein after said step (c), said arsenic acid is recovered.

11. The process of claim 2 wherein said aqueous mixture is heated after said acid addition.

12. The process of claim 2 wherein said aqueous mixture is heated during said acid addition.

13. The process of claim 2 wherein said aqueous mixture is heated before said acid addition.

14. The process of claim 1 wherein before said acid addition of said step (a), said aqueous mixture is heated to a temperature of about 50° C. to about 150° C.

15. The process of claim 2 wherein before said acid addition of said step (a), said aqueous mixture is heated to a temperature of about 50° C. to about 150° C.

16. The process of claim 1 wherein in said step (a), said acid is arsenic acid.

17. The process of claim 1 wherein in said step (a), said acid is perchloric acid.

18. The process of claim 1 wherein in said step (a), said acid is sulfuric acid.

19. The process of claim 1 wherein in said step (a), said acid is a mixture of at least two of said acids.

20. The process of claim 2 wherein in said step (a), said acid is arsenic acid.

21. The process of claim 2 wherein in said step (a), said acid is perchloric acid.

22. The process of claim 2 wherein in said step (a), said acid is sulfuric acid.

23. The process of claim 2 wherein in said step (a), said acid is a mixture of at least two of said acids.

24. The process of claim 1 wherein in said step (b), said heated acid mixture has a temperature of about 75° C. to about 200° C.

25. The process of claim 2 wherein in said step (b), said heated acid mixture has a temperature of about 75° C. to about 200° C.

26. The process of claim 1 wherein in said step (b), said heated acid mixture has a temperature of about 130° C. to about 175° C.

27. The process of claim 2 wherein in said step (b), said heated acid mixture has a temperature of about 130° C. to about 175° C.

28. The process of claim 1 wherein in said step (a), said acid is added in an amount sufficient to break the azeotrope between said hydrogen fluoride and said water which is sufficient to catalyze said hydrolysis of said hexafluoroarsenic acid or salt thereof.

29. The process of claim 2 wherein in said step (a), said acid is added in an amount sufficient to break the azeotrope between said hydrogen fluoride and said water which is sufficient to catalyze said hydrolysis of said hexafluoroarsenic acid or salt thereof.

30. The process of claim 1 wherein said acid is added in an amount of at least about 45 percent by weight based on the total weight of said added acid and said aqueous mixture at time of said acid addition.

31. The process of claim 2 wherein said acid is added in an amount of at least about 45 percent by weight based on the total weight of said added acid and said aqueous mixture at time of said acid addition.

32. The process of claim 1 wherein said acid is preferably added in an amount of about 45 percent to about 85 percent by weight based on the total weight of said added acid and said aqueous mixture at the time of said acid addition.

33. The process of claim 2 wherein said acid is preferably added in an amount of about 45 percent to about 85 percent by weight based on the total weight of said added acid and said aqueous mixture at the time of said acid addition.

34. The process of claim 1 wherein said inert gas of said step (b) is selected from the group consisting of steam, air, nitrogen, methane, carbon dioxide, and mixtures thereof.

35. The process of claim 1 wherein said inert gas is air.

36. The process of claim 1 wherein said inert gas is nitrogen.

37. The process of claim 1 wherein said inert gas is steam.

38. The process of claim 1 wherein said inert gas comprises a mixture of gases.

39. The process of claim 2 wherein said inert gas of said step (b) is selected from the group consisting of steam, air, nitrogen, methane, carbon dioxide, and mixtures thereof.

40. The process of claim 2 wherein said inert gas is air.

41. The process of claim 2 wherein said inert gas is nitrogen.

42. The process of claim 2 wherein said inert gas is steam.

43. The process of claim 2 wherein said inert gas comprises a mixture of gases.

44. The process of claim 1 wherein said inert gas is steam and said steam raises the temperature of said aqueous mixture sufficient to remove substantially all of said hydrogen fluoride.

45. The process of claim 2 wherein said inert gas is steam and said steam raises the temperature of said aqueous mixture sufficient to remove substantially all of said hydrogen fluoride.

46. The process of claim 1 wherein a salt of hexafluoroarsenate ion is hydrolyzed.

47. The process of claim 2 wherein a salt of hexafluoroarsenate ion is hydrolyzed.

48. The process of claim 46 wherein said salt is selected from the group consisting of $KAsF_6$, $NaAsF_6$, $NH_4AsF_6$, $Ca(AsF_6)_2$, and $Mg(AsF_6)_2$.

49. The process of claim 47 wherein said salt is selected from the group consisting of $KAsF_6$, $NaAsF_6$, $NH_4AsF_6$, $Ca(AsF_6)_2$, and $Mg(AsF_6)_2$.

50. The process of claim 1 wherein said separated hydrogen fluoride is recovered as a product.

51. The process of claim 2 wherein said separated hydrogen fluoride is recovered as a product.

* * * * *